United States Patent
Cassagne et al.

(10) Patent No.: US 9,592,917 B2
(45) Date of Patent: Mar. 14, 2017

(54) ASSEMBLY COMPRISING AN ARTICULATION SPINDLE SUPPORTED BY A CLEVIS AND IMMOBILIZED IN TRANSLATION BY A BLOCKING DEVICE INTEGRATING A DOUBLE ANTI-ROTATION SYSTEM

(71) Applicant: Airbus Operations (SAS), Toulouse (FR)

(72) Inventors: Jerome Cassagne, Toulouse (FR); Thomas Deforet, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 11 days.

(21) Appl. No.: 14/553,342

(22) Filed: Nov. 25, 2014

(65) Prior Publication Data

US 2015/0166189 A1 Jun. 18, 2015

(30) Foreign Application Priority Data

Dec. 12, 2013 (FR) ..................................... 13 62482

(51) Int. Cl.
  *B64D 27/26* (2006.01)
  *B64D 27/12* (2006.01)
  (Continued)

(52) U.S. Cl.
  CPC ............. *B64D 27/26* (2013.01); *B64D 27/12* (2013.01); *F02C 7/20* (2013.01); *F16B 21/12* (2013.01);
  (Continued)

(58) Field of Classification Search
  CPC ....................................................... B64D 27/26
  (Continued)

(56) References Cited

U.S. PATENT DOCUMENTS

| 3,638,980 A | 2/1972 | Kleinhenn |
| 3,831,888 A * | 8/1974 | Baker .................... B64D 27/18 |
| | | 244/54 |

(Continued)

FOREIGN PATENT DOCUMENTS

| FR | 2887853 | 1/2007 |
| GB | 186552 | 10/1922 |

(Continued)

OTHER PUBLICATIONS

French Search Report, Aug. 26, 2014.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

An assembly having an articulation spindle mounted in a first sleeve inserted into a first arm of a clevis and in a second sleeve inserted into a second arm of said clevis. The assembly comprises a blocking device which comprises a cylindrical stop housed in an extension of the second sleeve and comprising a front face against which a second end of the articulation spindle can come to bear, and a bolt-and-nut able to adopt a locked state, in which it passes through the stop and the extension so as to immobilize the stop in the extension, and an unlocked state, in which it does not pass through the stop and allows the stop to be removed from the extension.

20 Claims, 3 Drawing Sheets

(51) Int. Cl.
*F02C 7/20* (2006.01)
*F16B 21/12* (2006.01)
*F16C 11/04* (2006.01)

(52) U.S. Cl.
CPC ........ *F16C 11/04* (2013.01); *B64D 2027/262* (2013.01); *Y10T 403/32606* (2015.01)

(58) Field of Classification Search
USPC ........................................................ 244/54
See application file for complete search history.

(56) References Cited

U.S. PATENT DOCUMENTS

| | | | |
|---|---|---|---|
| 4,943,013 A | 7/1990 | Kapala et al. | |
| 5,176,339 A * | 1/1993 | Schmidt | B64D 27/00 244/131 |
| 5,782,430 A * | 7/1998 | Mouille | B64C 27/001 244/17.27 |
| 6,474,596 B1 * | 11/2002 | Cousin | B64D 27/26 244/131 |
| 6,669,393 B2 * | 12/2003 | Schilling | F02C 7/20 244/54 |
| 6,843,449 B1 * | 1/2005 | Manteiga | B64D 27/26 244/54 |
| 7,325,770 B2 * | 2/2008 | Chevalier | B64D 27/26 244/54 |
| 7,891,604 B2 | 2/2011 | Combes et al. | |
| 8,322,651 B2 * | 12/2012 | Levert | B64C 27/26 244/53 R |
| 8,348,191 B2 * | 1/2013 | West | B64D 27/26 244/54 |
| 8,561,941 B2 | 10/2013 | Combes et al. | |
| 8,596,603 B2 | 12/2013 | Gallet et al. | |
| 8,740,136 B2 | 6/2014 | Audart-Noel et al. | |
| 2006/0138295 A1 | 6/2006 | Blateri | |
| 2008/0156930 A1 | 7/2008 | Audart-Noel et al. | |
| 2015/0166190 A1 | 6/2015 | Cassagne et al. | |
| 2015/0166191 A1 | 6/2015 | Cassagne et al. | |
| 2015/0167726 A1 | 6/2015 | Cassagne et al. | |

FOREIGN PATENT DOCUMENTS

| | | |
|---|---|---|
| JP | S6014312 | 1/1985 |
| JP | S6289341 U | 6/1987 |

* cited by examiner

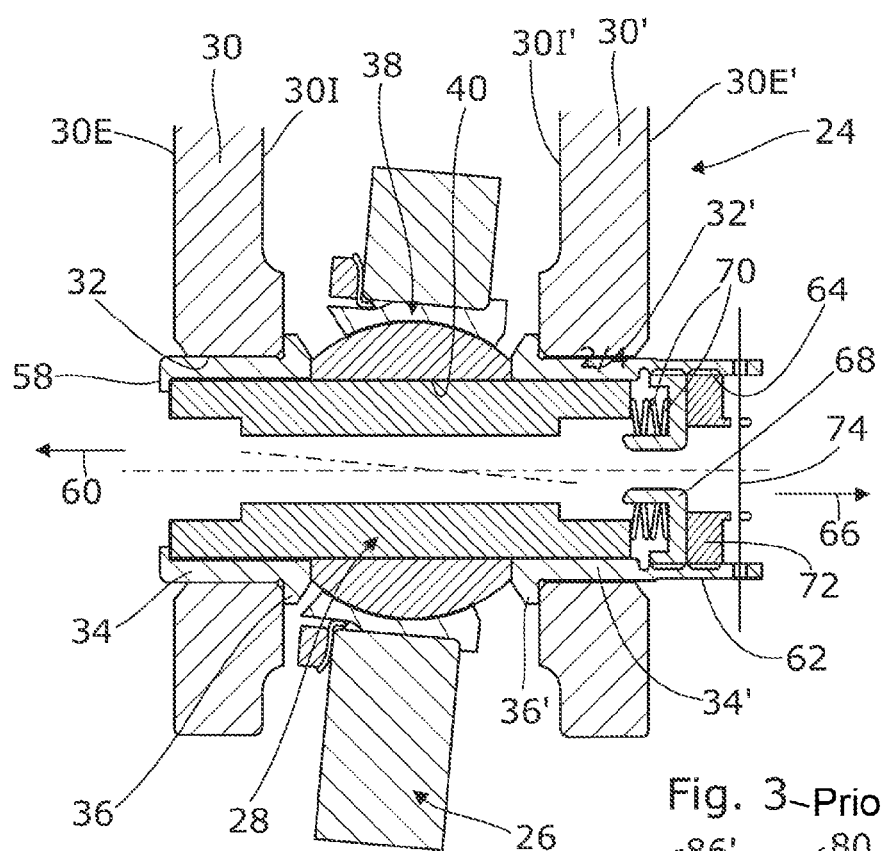
Fig. 3 - Prior Art
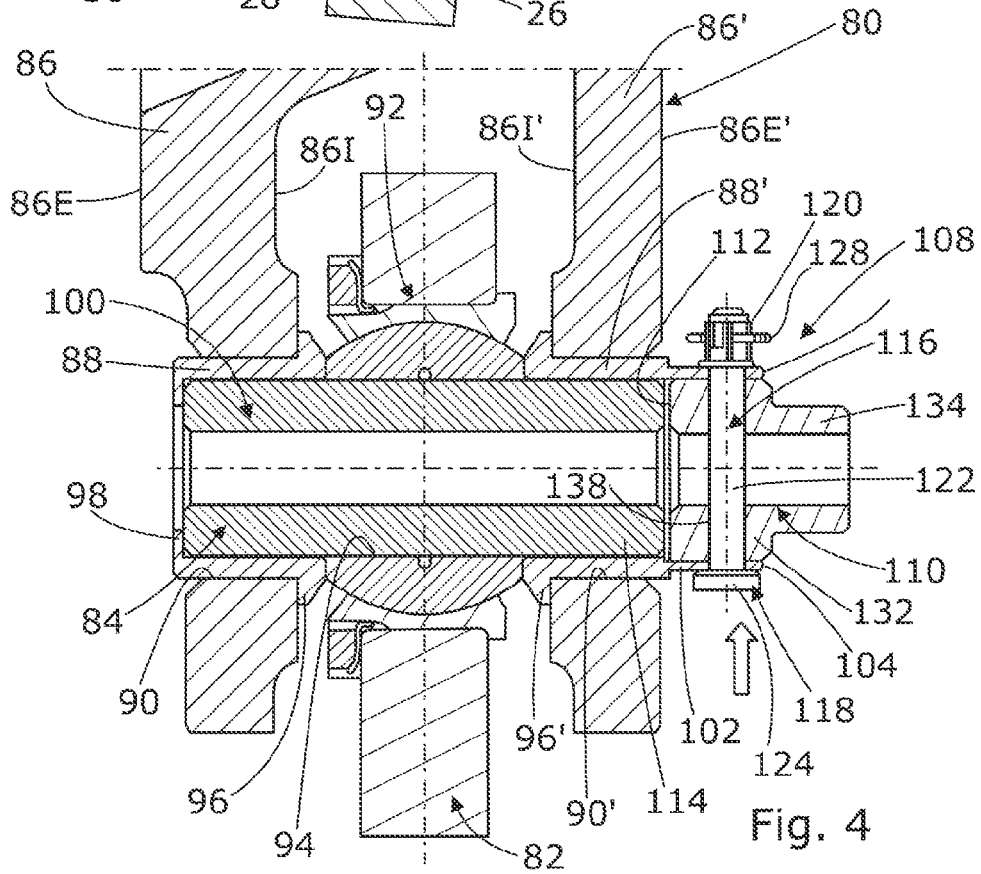
Fig. 4

ASSEMBLY COMPRISING AN ARTICULATION SPINDLE SUPPORTED BY A CLEVIS AND IMMOBILIZED IN TRANSLATION BY A BLOCKING DEVICE INTEGRATING A DOUBLE ANTI-ROTATION SYSTEM

CROSS-REFERENCES TO RELATED APPLICATIONS

This application claims the benefit of the French patent application No. 1362482 filed on Dec. 12, 2013, the entire disclosures of which are incorporated herein by way of reference.

BACKGROUND OF THE INVENTION

In the field of aeronautics, according to one configuration shown in FIG. 1, an engine 10 is connected to a wing 12 of an aircraft via the intermediary of an attachment pylon 14.

The attachment pylon 14 is connected to the wing 12 via the intermediary of fasteners 16, 16', at the front and at the rear of the attachment pylon. In parallel, the engine 10 is connected to the attachment pylon 14 via the intermediary of fasteners 18, 18', at the front and at the rear of the engine. The connection between the engine 10 and the attachment pylon 14 comprises lateral link rods 20 which take up the thrust forces generated by the engine 10, each lateral link rod 20 being connected at a first end by a fastener 22 to the engine 10 and at a second end by a fastener 22' to the attachment pylon 14.

Some of these fasteners 16, 16', 18, 18', 22, 22' comprise at least one assembly with an articulation spindle connecting a clevis and a ferrule.

One embodiment of an assembly provided at the fastener 18' connecting the engine 10 and the attachment pylon 14 at the rear of the engine is shown in FIG. 2.

This assembly comprises a clevis 24 connected to the attachment pylon 14, a ferrule 26 connected to the engine and an articulation spindle 28 connecting the clevis 24 and the ferrule 26.

The clevis 24 comprises two arms 30, 30', each comprising an inner face 30I, 30I' and an outer face 30E, 30E', wherein the inner faces 30I and 30I' face each other.

Each arm 30, 30' comprises a bore 32, 32' into which is inserted a sleeve 34, 34', the two sleeves 34, 34' being coaxial and aligned and having equal internal diameters.

In the following, the longitudinal direction corresponds to the direction of the axes of the sleeves 34, 34'.

Each sleeve 34, 34' comprises an outer shoulder 36, 36' which presses against the inner face 30I, 30I' of the arm into which it is inserted, so as to limit the movement in translation of said sleeves 34, 34' in the longitudinal direction.

The ferrule 26 comprises a swivel bearing 38 with a bore 40 whose diameter is substantially equal to the internal diameter of the sleeves 34, 34'.

The articulation spindle 28 comprises a hollow cylindrical body whose outer diameter is substantially equal to the internal diameter of the sleeves 34, 34' and the diameter of the bore 40 of the swivel bearing 38.

In order to avoid the articulation spindle 28 coming out of the sleeves and the fastener coming apart, the assembly comprises a blocking device for immobilizing the articulation spindle in translation in the longitudinal direction.

According to a first embodiment shown in FIG. 2, the blocking device comprises:

a bolt 42 with a shank 44 housed in the articulation spindle 28, a head 46 at a first end of the shank and a threaded portion 48 at a second end of the shank, a self-locking nut 50 which is screwed onto the threaded portion 48 of the bolt 42, a first washer 52 which is interposed between the head 46 of the bolt and the articulation spindle 28 and whose outer diameter is greater than the outer diameter of the articulation spindle, a second washer 54 which is interposed between the nut 50 and the articulation spindle 28 and whose outer diameter is greater than the outer diameter of the articulation spindle, a pin 56 which passes through the nut 50 and the shank 44 of the bolt so as to immobilize the nut 50 with respect to the bolt 42.

According to this embodiment, the self-locking nut 50 corresponds to a first anti-rotation system and the pin 56 corresponds to a second anti-rotation system.

During assembly, the bolt 42 is introduced from a first end of the articulation spindle 28 whereas the nut 50 and the pin 56 are maneuvered from a second end of the articulation spindle. As a consequence, this first embodiment requires free space on both sides of the clevis 24.

In order to remedy this drawback, and to allow assembly from just one side of the clevis, a second embodiment shown in FIG. 3 has been developed.

This embodiment is more particularly suited to fasteners 18 located at the front of the engine 10.

Those elements which are in common with the first embodiment are referenced in the same manner.

According to this second embodiment, the sleeve 34 of the first arm 30 of the clevis 24 comprises at a first end an outer shoulder 36 which projects out from the sleeve and which bears against the inner face 30I of the first arm 30 and at a second end an inner shoulder 58 which projects into the sleeve and which acts as a stop against which a first end of the articulation spindle 28 comes to bear in order to limit the movement thereof in translation in the longitudinal direction in a first sense indicated by the arrow 60 in FIG. 3.

The sleeve 34' of the second arm 30' of the clevis 24 comprises at a first end an outer shoulder 36' which projects out from the sleeve and which bears against the inner face 30I' of the second arm 30' and at a second end an extension 62 which extends beyond the outer face 30E' of the second arm 30' and which comprises a tapped bore 64 whose diameter is greater than the internal diameter of the sleeve 34'.

According to this second embodiment, a blocking device makes it possible to limit the movement in translation of the articulation spindle 28 in the longitudinal direction in a second sense indicated by the arrow 66 in FIG. 3. The blocking device comprises:

a first headless screw 68 which is screwed into the tapped bore 64, at least one elastic washer 70 interposed between the second end of the articulation spindle 28 and the first headless screw 68, a second headless screw 72 which is screwed into the tapped bore 64 and presses against the other side of the first headless screw 68 from the elastic washer(s) 70, a flexible or rigid longilinear element 74 which passes through the extension 62 and the second headless screw 72 so as to immobilize said second headless screw 72 in rotation with respect to the extension 62.

The longilinear element 74 corresponds to a first anti-rotation system and mounting the first headless screw 68 between at least one elastic washer 70 and a second headless screw 72 corresponds to a second anti-rotation system.

This second embodiment has the advantage that it is possible to carry out the assembly from just one side of the clevis.

However, installing the headless screws 68 and 72 inside the tapped bore 64 is not easy and requires the use of tools. This installation is even more difficult when the articulation spindles are of smaller diameter. Indeed, in this case, it is necessary to exert a relatively large torque given the small diameter of the headless screws in order to compress the elastic washer(s) and obtain the second anti-rotation system.

The present invention aims to remedy the drawbacks of the prior art.

SUMMARY OF THE INVENTION

To that end, the invention relates to an assembly having an articulation spindle mounted in a first sleeve inserted into a first arm of a clevis and in a second sleeve inserted into a second arm of said clevis.

The articulation spindle is immobilized in translation by an inner shoulder of the first sleeve which acts as a stop for a first end of said articulation spindle, and by a blocking device which acts as a stop for a second end of said articulation spindle.

According to the invention, the assembly is characterized in that the blocking device comprises:
- a cylindrical stop which is housed in an extension of the second sleeve and which comprises a front face which acts as a stop for the second end of the articulation spindle,
- a bolt-and-nut which is able to adopt a locked state, in which it passes through the stop and the extension so as to immobilize the stop in the extension, and an unlocked state, in which it does not pass through the stop and allows the stop to be removed from the extension.

The stop preferably comprises a first cylindrical portion with an external diameter which is substantially equal to the internal diameter of the extension and a second cylindrical portion whose diameter is smaller than that of the first portion.

Advantageously, the lengths of the stop and of the extension are adjusted such that when the assembly is assembled, the second portion of the stop is arranged at least partially outside the extension.

According to one embodiment, the stop comprises at least one through passage for housing part of the bolt-and-nut. Each through passage of the stop is arranged in a transverse plane.

According to one embodiment, the extension comprises at least one pair of orifices which are configured so as to receive the bolt-and-nut, the orifices of each pair being diametrically opposite one another and arranged in a transverse plane. Advantageously, the extension comprises, on its outer surface, flattened portions which extend about each orifice.

According to one embodiment, the bolt-and-nut comprises a bolt, a slotted nut and a split pin which passes through the bolt.

The present application also relates to an aircraft comprising an assembly according to the invention for connecting an engine to a wing.

BRIEF DESCRIPTION OF THE DRAWINGS

Other characteristics and advantages will emerge from the ensuing description of the invention, description given solely by way of example, with regard to the appended drawings in which:

FIG. 3 is a section through an assembly having an articulation spindle which illustrates a second embodiment of the prior art, FIG. 4 is a section through an assembly having an articulation spindle which illustrates a first embodiment of the invention.

DETAILED DESCRIPTION OF THE PREFERRED EMBODIMENTS

Figure 1:
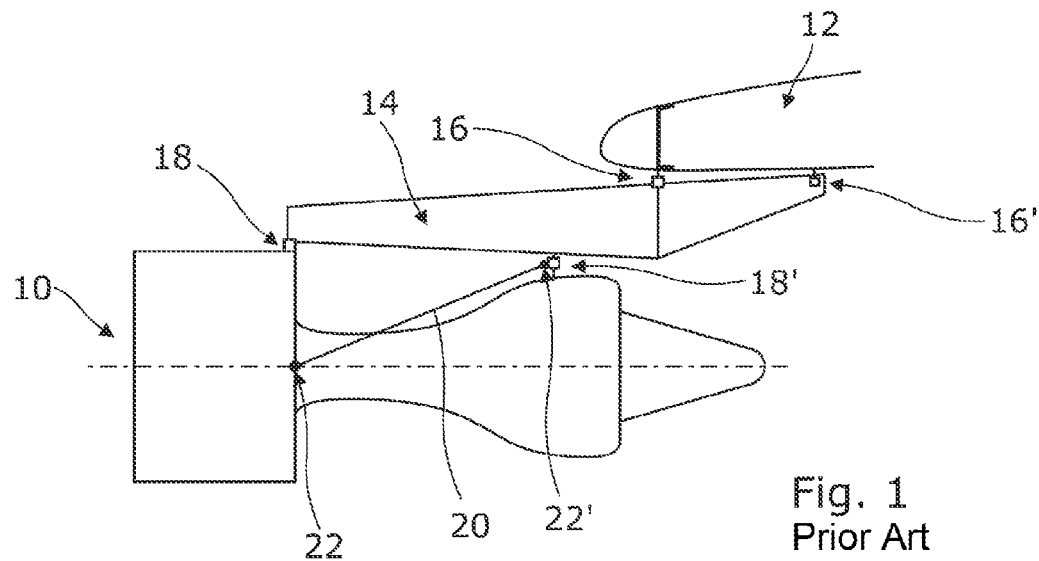
FIG. 1 is a schematic representation of a connection between an engine and a wing of an aircraft.
Figure 2:
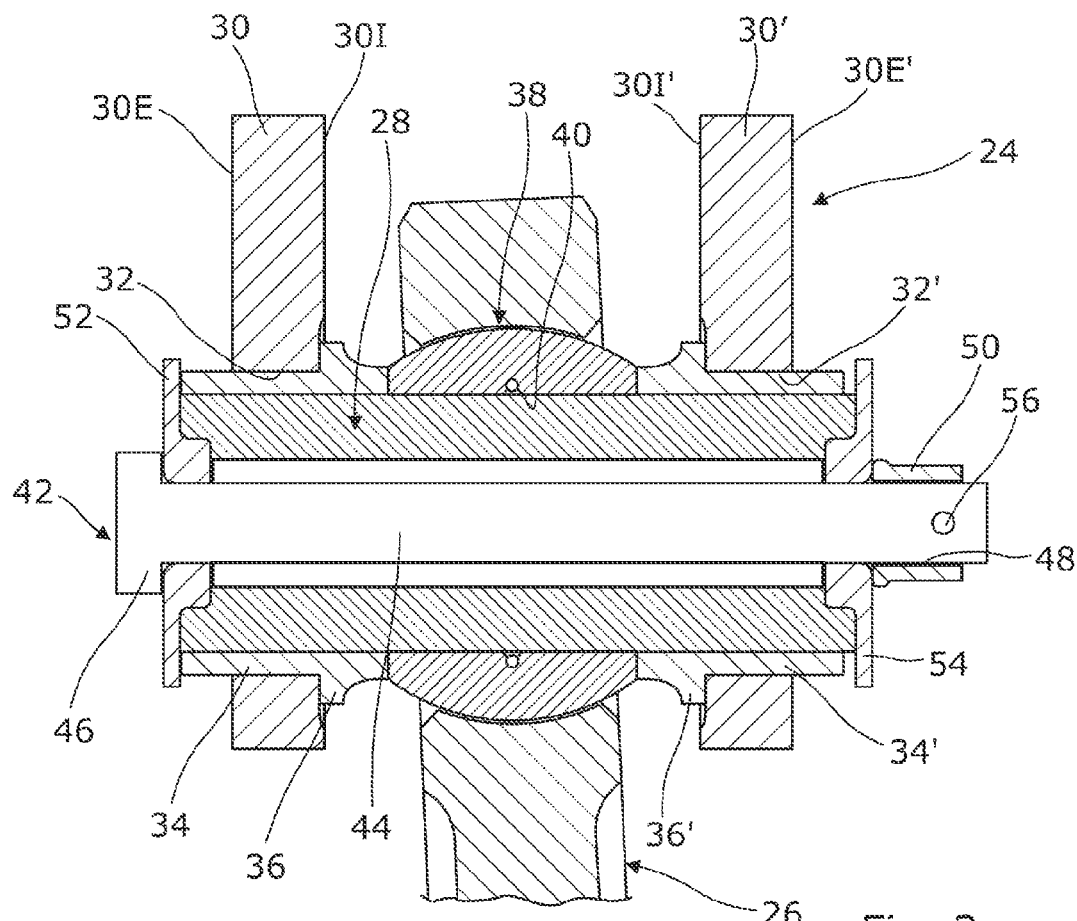
FIG. 2 is a section through an assembly having an articulation spindle which illustrates a first embodiment of the prior art.

FIG. 4 shows an assembly connecting an attachment pylori and an engine of an aircraft.

This assembly comprises a clevis 80 secured to the attachment pylori, a ferrule 82 secured to the engine and an articulation spindle 84 connecting the clevis 80 and the ferrule 82.

Of course, the invention is not limited to this application. It may be used for the other fasteners between the wing/the attachment pylori and the attachment pylon/the engine.

The clevis 80 comprises a first arm 86 and a second arm 86', each comprising an inner face 86I, 86I' and an outer face 86E, 86E', wherein the inner faces 86I and 86I' face each other.

The assembly comprises a first sleeve 88 supported by the first arm 86 and a second sleeve 88' supported by the second arm 86', the first and second sleeves 88, 88' being coaxial and aligned and having substantially equal internal diameters.

In the rest of the description, the longitudinal direction corresponds to the direction of the axes of the sleeves 88, 88'. A transverse plane is perpendicular to the longitudinal direction.

According to one embodiment, the first arm 86 comprises a first through hole 90 which opens at the inner face 86I and outer face 86E of said first arm and into which is inserted the first sleeve 88. In parallel, the second arm 86' comprises a second through hole 90' which opens at the inner face 86I' and outer face 86E' of said second arm 86' and into which is inserted the second sleeve 88'. The outer diameter of the first sleeve 88 is substantially greater than the diameter of the first through hole 90, making an interference fit possible. The outer diameter of the second sleeve 88' is substantially greater than the diameter of the second through hole 90', making an interference fit possible. By virtue of the interference fits, the sleeves 88, 88' are fixed with respect to the arms 86, 86'.

The ferrule 82 comprises a bearing 92 with a cylindrical bearing surface 94 whose diameter is substantially equal to the internal diameters of the sleeves 88, 88'. The bearing 92 is preferably a swivel bearing.

The articulation spindle 84 comprises a solid or hollow cylindrical body whose outer diameter is substantially equal to the internal diameters of the sleeves 88, 88' and the diameter of the cylindrical bearing surface 94 of the bearing of the ferrule.

The first sleeve 88 of the first arm 86 comprises at a first end an outer shoulder 96 which projects out from the first sleeve and which bears against the inner face 86I of the first arm 86 and at a second end an inner shoulder 98 which projects into the sleeve and which acts as a stop against which a first end 100 of the articulation spindle 84 can come to bear when it is installed.

The second sleeve 88' of the second arm 86' comprises at a first end an outer shoulder 96' which projects out from the second sleeve and which bears against the inner face 86I' of the second arm 86' and at a second end an extension 102 in the form of a hollow cylinder which extends beyond the outer face 86E' of the second arm 86' and which ends in a circumferential rim 104 arranged in a transverse plane.

The outer diameter of this extension 102 is slightly smaller than the outer diameter of the rest of the second sleeve 88'.

The extension 102 comprises an internal diameter which is substantially equal to or slightly larger than the internal diameter of the rest of the second sleeve 88'.

The articulation spindle 84 is immobilized in translation in the longitudinal direction by means of:

the inner shoulder 98 of the first sleeve 88 which limits the movement of the articulation spindle 84 in the sleeves 88, 88', in the sense of introduction (labeled 106 in FIG. 5), and a blocking device 108 which limits the movement of the articulation spindle 84 in the sense of withdrawing said articulation spindle.

According to one embodiment of the invention, the blocking device 108 comprises:

a cylindrical stop 110 which is housed in the extension 102 and which comprises a front face 112 against which a second end 114 of the articulation spindle 84 can bear, a bolt-and-nut 116 which is able to adopt a locked state, in which it passes through the stop 110 and the extension 102 so as to immobilize the stop 110 in the extension 102, and an unlocked state, in which it does not pass through the stop 110 and the extension 102 and allows the stop 110 to be removed from the extension 102.

The bolt-and-nut 116 comprises two anti-rotation systems.

The bolt-and-nut 116 comprises on one hand a bolt 118 and on the other hand a nut 120.

The bolt 118 comprises a shank 122 with, at a first end, a head 124 and, at a second end, a threaded portion 126 (shown in FIG. 5) onto which the nut 120 is screwed.

The distance between the head 124 and the threaded portion 126 is smaller than the external diameter of the extension 102.

According to one embodiment, the nut 120 is self-locking so as to obtain a first anti-rotation system. As a variant, an elastic washer may be interposed between the nut 120 and the extension 102.

According to one embodiment, the nut 120 is a slotted nut. In addition, the assembly comprises a split pin 128 for preventing the nut 120 from rotating with respect to the shank 122 of the bolt 118. The shank 122 comprises a through passage 130 which extends along a diameter of the shank in a plane perpendicular to the axis of the shank 122 and whose diameter is equal, give or take the functional clearance, to that of the split pin 128.

The split pin 128 constitutes a second anti-rotation system.

The stop 110 comprises a first cylindrical portion 132 with an external diameter which is substantially equal to the internal diameter of the extension 102 and a second cylindrical portion 134 whose diameter is smaller than that of the first portion 132.

The length of the first portion 132 of the stop 110 is substantially equal to the length of the extension 102 and extends from the front face 112 of the stop 110.

Figure 6:
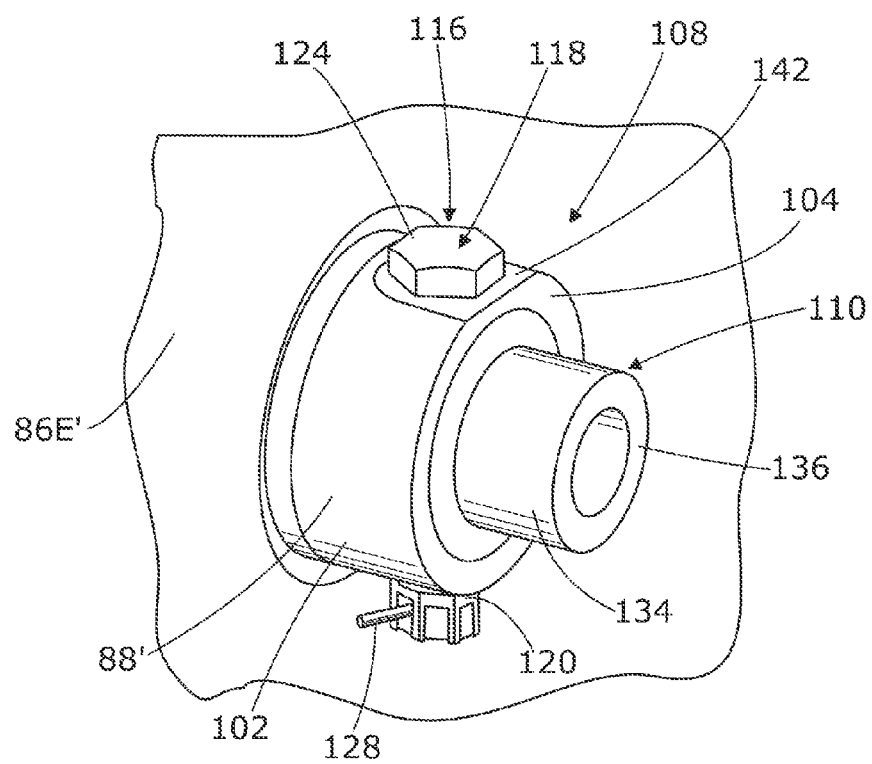
FIG. 6 is a perspective view of one portion of the assembly shown in FIG. 4, in the installed state.

The second portion 134 of the stop 110 extends from the first portion 132 to the rear face 136 of the stop 110 (shown in FIG. 6).

The lengths of the stop 110 and of the extension 102 are adjusted such that, when the assembly is assembled, the second portion 134 is arranged at least partially outside the extension 102, which facilitates its installation.

The stop 110 comprises at least one through passage 138 whose diameter is substantially equal, give or take the functional clearance, to that of the shank 122 of the bolt 118. According to one embodiment, each through passage 138 is arranged in a transverse plane and extends along a diameter of the stop 110.

According to one embodiment, the stop 110 comprises a single through passage 138.

Figure 5:
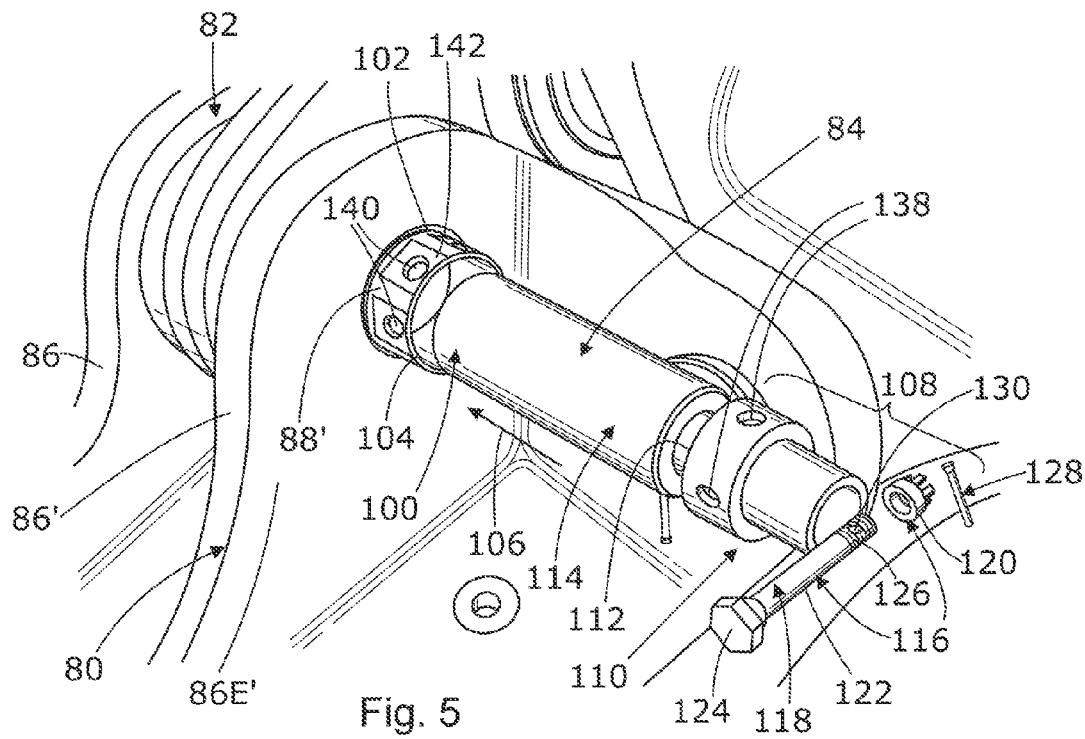
FIG. 5 is a perspective view of an assembly having an articulation spindle which illustrates another embodiment of the invention, during installation.

According to another embodiment shown in FIG. 5, the stop 110 comprises multiple through passages 138.

The extension 102 comprises at least one pair of orifices 140 for housing part of the bolt-and-nut 116. Each orifice 140 has a diameter which is equal, give or take the functional clearance, to that of the shank 122 of the bolt 118.

According to one embodiment shown in FIG. 6, the extension 102 comprises a pair of orifices 140 which are diametrically opposite one another and are arranged in a transverse plane.

According to another embodiment shown in FIG. 5, the extension 102 comprises multiple pairs of orifices 140 which are arranged in a transverse plane, the orifices 140 of each pair being diametrically opposite one another.

For preference, the extension 102 comprises, on its outer surface, flattened portions 142 which extend about each orifice 140. These flattened portions 142 form surfaces which are substantially flat and perpendicular to the shank 122 of the bolt 118 and against which the head 124 and the nut 120 of the bolt-and-nut 116 bear.

In order to produce the assembly, the sleeves 88, 88' are inserted into the arms 86, 86' of the clevis 80 from the inside of the arms. The ferrule 82 is then introduced between the arms 86, 86' until the axis of the bearing 92 of the ferrule 82 is aligned with the axes of the sleeves 88, 88'. The articulation spindle 84 is introduced into the sleeves 88, 88' and the bearing 92 from a first side of the clevis 80, until it comes to bear against the inner shoulder 98 of the first sleeve 88. Then, the stop 110 is introduced into the extension 102. Two orifices 140 of the extension are aligned with a through passage 138 of the stop 110.

The shank 122 of the bolt 118 is introduced into the orifices 140 and the through passage 138. The slotted nut 120 is then screwed onto the threaded portion 126 of the shank 122 until the head 124 of the bolt 118 and the nut 120 come to bear against the outer surface of the extension 102. The split pin 128 is installed so as to prevent the slotted nut 120 from rotating with respect to the shank 122 of the bolt 118. The end of at least one arm of the split pin 128 is folded over so as to prevent said split pin 128 from coming out of the through passage 130 of the shank 122 of the bolt.

The advantages of the assembly according to the invention are as follows:

this assembly makes it possible to introduce the articulation spindle and to block it in translation from just one side of the clevis. It is thus possible to arrange the devises of the engine/attachment pylon fasteners so as to allow introduction from one side of the nacelle in the case of a nacelle configuration having a small ground clearance, this assembly makes it possible to simplify the installation of the blocking device with a double anti-rotation system and to limit the use of tools this assembly requires no modification to the clevis or the ferrule.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An assembly comprising:
   an articulation spindle mounted in a first sleeve inserted into a first arm of a clevis and in a second sleeve inserted into a second arm of said clevis, said first sleeve comprising an inner shoulder which projects into said first sleeve and which acts as a stop for a first end of said articulation spindle, wherein the first sleeve and the second sleeve are coaxial on an axis, and
   a blocking device configured to act as a stop for a second end of said articulation spindle, the blocking device comprising:
      a cylindrical stop which is housed in an extension of the second sleeve and comprising a front face acting as a stop for the second end of the articulation spindle, and
      a bolt-and-nut configured to adopt a locked state, in which the bolt passes through the stop and the extension so as to immobilize the stop in the extension and an unlocked state, in which it does not pass through the stop and allows the stop to be removed from the extension, and wherein the bolt comprises a shank that has a longitudinal axis perpendicular to the axis of the sleeves.

2. The assembly as claimed in claim 1, wherein the stop comprises a first cylindrical portion with an external diameter substantially equal to an internal diameter of the extension and a second cylindrical portion whose diameter is smaller than that of the first portion.

3. The assembly as claimed in claim 2, wherein the stop and the extension each have lengths which are selected such that, when the assembly is assembled, the second portion of the stop is arranged at least partially outside the extension.

4. The assembly as claimed in claim 1, wherein the stop comprises at least one through passage for housing part of the bolt-and-nut.

5. The assembly as claimed in claim 4, wherein each through passage is arranged in a transverse plane.

6. The assembly as claimed in claim 1, wherein the extension comprises at least one pair of orifices configured so as to receive the bolt-and-nut, the orifices of each pair being diametrically opposite one another and arranged in a transverse plane.

7. The assembly as claimed in claim 6, wherein the extension comprises, on an outer surface thereof, flattened portions which extend around each orifice.

8. The assembly as claimed in claim 1, wherein the bolt-and-nut comprises a bolt, a slotted nut and a split pin passing through the bolt.

9. An aircraft comprising:
   an assembly comprising:
      an articulation spindle mounted in a first sleeve inserted into a first arm of a clevis and in a second sleeve inserted into a second arm of said clevis, wherein the first sleeve and the second sleeve are coaxial on an axis, said first sleeve comprising an inner shoulder which projects into said first sleeve towards the axis and which acts as a stop for a first end of said articulation spindle, and
      a blocking device configured to act as a stop for a second end of said articulation spindle, the blocking device comprising:
         a cylindrical stop which is housed in an extension of the second sleeve and comprising a front face acting as a stop for the second end of the articulation spindle, and
         a bolt-and-nut configured to adopt a locked state, in which it passes through the stop and the extension so as to immobilize the stop in the extension and an unlocked state, in which it does not pass through the stop and allows the stop to be removed from the extension, wherein the bolt-and-nut comprises a bolt and a nut, wherein the bolt comprises a head at a first end and a shank extending away from the head to a second end in a direction perpendicular to the axis of the sleeves, the second end being configured to receive the nut,
   an engine, and
   a wing,
   wherein the assembly connects the engine to the wing.

10. The assembly as claimed in claim 1, wherein said inner shoulder projects into said first sleeve toward the axis.

11. The assembly as claimed in claim 1, wherein the bolt-and-nut comprises a bolt and a nut, wherein the bolt comprises a head at a first end and a second end configured to receive the nut.

12. An assembly comprising:
   an articulation spindle mounted in a first sleeve inserted into a first arm of a clevis and in a second sleeve inserted into a second arm of said clevis, wherein the first sleeve and the second sleeve are coaxial on an axis,
   an inner shoulder disposed at an end of said first sleeve and wherein the inner shoulder precludes the passage of the articulation spindle out of the first sleeve, and
   a blocking device configured to act as a stop for a second end of said articulation spindle, the blocking device comprising:
      a cylindrical stop which is housed in an extension of the second sleeve and comprising a front face acting as a stop for the second end of the articulation spindle, and
      a bolt-and-nut configured to adopt a locked state, in which it passes through the stop and the extension so as to immobilize the stop in the extension, and an unlocked state, in which it does not pass through the stop and allows the stop to be removed from the extension, and wherein the bolt-and-nut comprises a bolt and a nut, wherein the bolt comprises a head at a first end and a shank extending away from the head to a second end configured to receive the nut, and wherein a longitudinal axis of the shank intersects with the axis of the sleeves.

13. The assembly as claimed in claim 12, wherein the stop comprises a first cylindrical portion with an external diameter substantially equal to an internal diameter of the extension and a second cylindrical portion whose diameter is smaller than that of the first portion.

14. The assembly as claimed in claim 13, wherein the first cylindrical portion comprises, on an outer surface thereof, flattened portions.

15. The assembly as claimed in claim 12, wherein the second end of the shank comprises a through passage.

16. The assembly as claimed in claim 15, further comprising a split pin extending through the through passage.

17. The assembly as claimed in claim 16, wherein the split pin extends through the through passage in a direction parallel to the axis of the first sleeve and the second sleeve.

18. The assembly as claimed in claim 16, wherein the split pin passes through the nut.

19. The assembly as claimed in claim 12, wherein the shank of the bolt passes through the extension and the stop.

20. The assembly as claimed in claim 19, wherein the extension includes at least two orifices for the shank, and wherein the stop includes at least two orifices for the shank.

\* \* \* \* \*